DOUGLAS F. POMEROY.
Improved Tire Bender.
No. 119,716.            Patented Oct. 10, 1871.
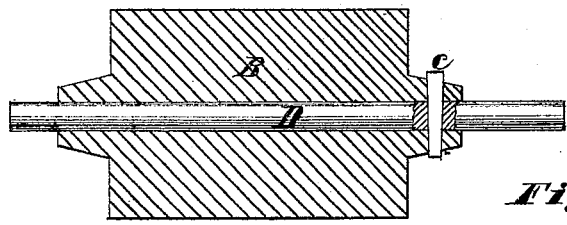
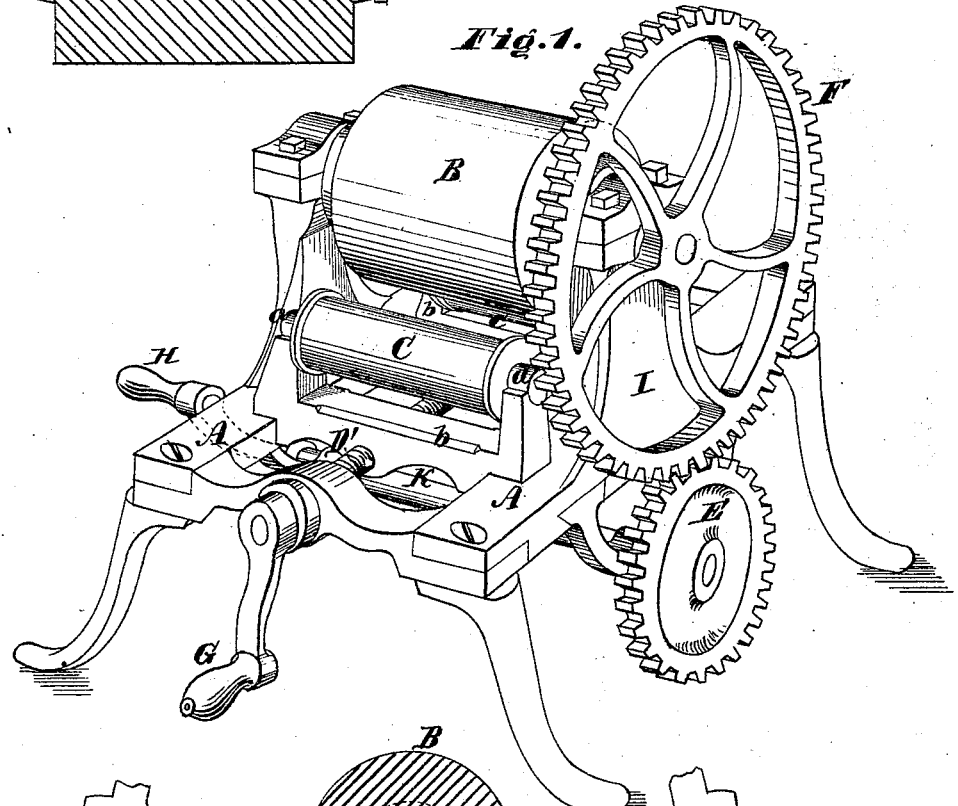
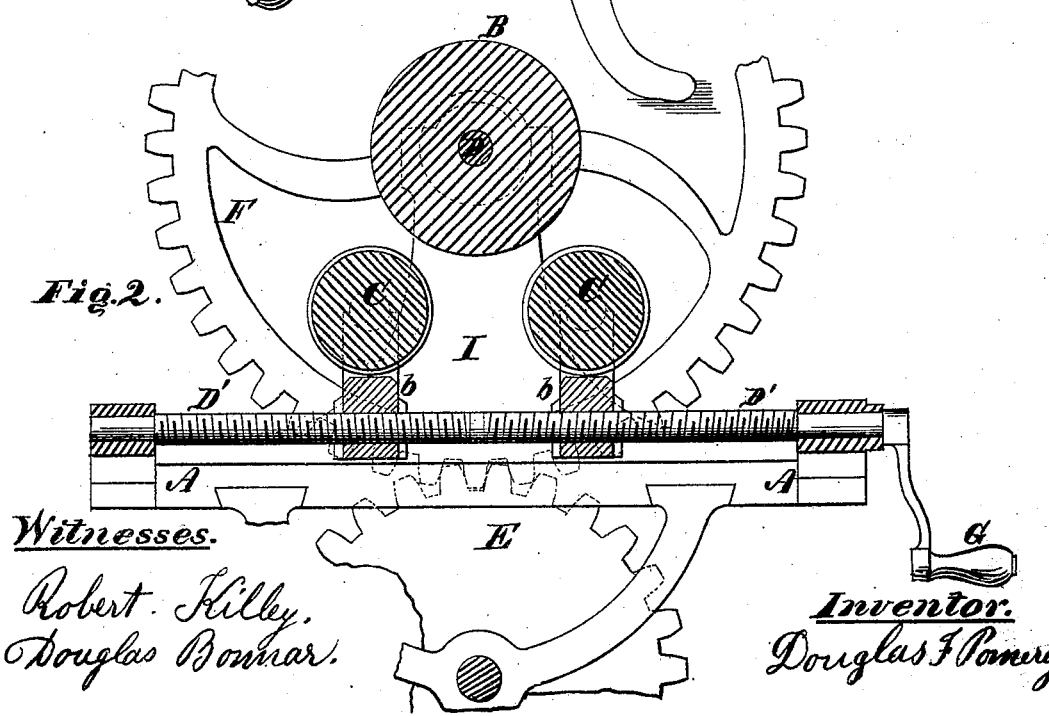
Witnesses.
Robert Killey.
Douglas Bonnar.
Inventor.
Douglas F. Pomeroy.

UNITED STATES PATENT OFFICE.

DOUGLAS F. POMEROY, OF PAINESVILLE, OHIO, ASSIGNOR OF ONE-HALF HIS RIGHT TO FINDLEY McGREW, OF SAME PLACE.

IMPROVEMENT IN MACHINES FOR BENDING TIRES.

Specification forming part of Letters Patent No. 119,716, dated October 10, 1871.

*To all whom it may concern:*

Be it known that I, DOUGLAS F. POMEROY, of Painesville, in the county of Lake and State of Ohio, have invented certain improvements in Tire-Benders, of which the following is a specification:

The first part of my invention relates to the combination of the adjustable gauge-rollers C and the main roller B. Said gauge-rollers C are adjusted back or forth by the screw D. By advancing the gauge-rollers near together a small circle, and by removing them from each other a large circle, is formed. The screw D' has a right-and-left-hand thread cut on it, which, when revolved, causes the rollers to advance toward each other or retreat, as wished, the two gauge-rollers being adjusted at the same distance from the main roller B, thus causing an equal pressure on both sides. The tire or other article which is acted on is made to assume a true circular form. The index $d$ serves as a guide in placing the slides $d$ in position.

Figure I is a view showing the machine perfect in all its parts. Fig. II is a vertical section of the same. Fig. III shows the position of the roller on the shaft and the position of the pin $c$.

A, Fig. 1, is a frame. Attached to each side of said frame are the upright bearings I, in which the main roller B is secured and revolved. The gauge-rollers C slide back or forth on the surface of the frame, and are moved by the screw D'. The ends of said screw are supported in bearings in each end of the frame. Said screw D' has a right-and-left-hand thread cut on it, so that by revolving the screw by the crank G the rollers can be made to advance to or retreat from each other, thus controlling the size of the circle to be acted on. When the gauge-rollers are removed from the main roller B the circle will be larger, and when advanced to it the circle will be smaller. The screw D' passes through apertures in the blocks $b\ b$. Said apertures have a corresponding right-and-left-hand female thread cut in them to take the thread on the screw D'. The index $d$ on the face of the frame gauges the size of the circle. The main roller B is revolved by the small gear E, which is secured on the shaft K, which is placed across the under side of the frame and in suitable bearings, and is revolved by the crank H. Said crank is shown by the dotted lines in Fig. I. Said gear-wheel E meshes into the drive gear-wheel F. Said wheel is firmly secured on the main shaft D, which has the main roller B secured upon it by the pin $c$, as shown in Fig. III. The roller B is removable, to permit the tire, &c., to be removed when finished.

The usual way of adjusting the gauge-rollers in bending-machines is, the rollers are placed in a series of bearings which extend along the two sides of the frame. Said plan is inconvenient, and does not allow of as nice an adjustment as my improvement does. As is seen, the gauge-rollers can be moved up by the screw D' to any point, and allows of a circle of any size that can be bent in the machine to be made.

What I claim as my invention, and desire to secure by Letters Patent, is—

The combination of the frame A, main roller B, gauge-rollers C C, standards I, slide blocks $b$, right-and-left-handed screw D', index $d$, and gear-wheels E and F, substantially as and for the purpose as hereinbefore set forth.

DOUGLAS F. POMEROY.

Witnesses:
ROBERT KELLEY,
DOUGLAS BONNAR.

(60)